(12) United States Patent
Linnartz et al.

(10) Patent No.: US 10,182,488 B2
(45) Date of Patent: Jan. 15, 2019

(54) RADIO FREQUENCY (RF) CONTROLLED LAMP WITH DIMMER COMPATIBILITY

(71) Applicant: PHILIPS LIGHTING HOLDING B.V., Eindhoven (NL)

(72) Inventors: Johan-Paul Marie Gerard Linnartz, Eindhoven (NL); Peter Deixler, Valkenswaard (NL); Yifeng Qiu, Eindhoven (NL); Paul Theodorus Jacobus Boonen, Tegelen (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/129,183

(22) PCT Filed: Mar. 12, 2015

(86) PCT No.: PCT/IB2015/051792
§ 371 (c)(1),
(2) Date: Sep. 26, 2016

(87) PCT Pub. No.: WO2015/145287
PCT Pub. Date: Oct. 1, 2015

(65) Prior Publication Data
US 2018/0007766 A1    Jan. 4, 2018

Related U.S. Application Data

(60) Provisional application No. 61/969,517, filed on Mar. 24, 2014.

(51) Int. Cl.
H05B 37/02    (2006.01)
H05B 33/08    (2006.01)

(52) U.S. Cl.
CPC ..... *H05B 37/0272* (2013.01); *H05B 33/0809* (2013.01); *H05B 33/0812* (2013.01);
(Continued)

(58) Field of Classification Search
None
See application file for complete search history.

(56) References Cited

U.S. PATENT DOCUMENTS 6,016,038 A    1/2000  Mueller et al.
6,211,626 B1   4/2001  Lys et al.
(Continued)

FOREIGN PATENT DOCUMENTS

EP    2012562 A1   7/2009
EP    2582208 A2   4/2013
(Continued)

*Primary Examiner* — Tung X Le
*Assistant Examiner* — Henry Luong
(74) *Attorney, Agent, or Firm* — Meenakshy Chakravorty

(57) ABSTRACT

An RF controlled lighting unit is provided, suitable for connection to at least one of a dimmer for adjusting a phase cut angle of input mains voltage in accordance with an adjustable dimming level or an electronic switch for selecting between on-and off-states. The lighting unit includes a solid state light source; a radio circuit for receiving a wireless control signal; a rectifier circuit for rectifying the input mains voltage received from the electronic switch or the dimmer; a first power converter for driving the solid state light source in response to the rectified input mains voltage and delivering power to the radio circuit; and a second power convertor for delivering power to the radio circuit when the rectified input mains voltage becomes inadequate for the first power converter due to the phase-cut angle of the rectified input mains voltage or the off-state of the electronic switch.

13 Claims, 9 Drawing Sheets

(52) U.S. Cl.
CPC ..... *H05B 33/0845* (2013.01); *H05B 33/0854* (2013.01); *H05B 37/0218* (2013.01)

(56) References Cited

U.S. PATENT DOCUMENTS

| | | |
|---|---|---|
| 7,256,554 B2 | 8/2007 | Lys |
| 7,362,285 B2 | 4/2008 | Webb et al. |
| 2006/0012317 A1 | 1/2006 | Chiu et al. |
| 2008/0303451 A1 | 12/2008 | Mosebrook et al. |
| 2011/0121728 A1 | 5/2011 | Fung |
| 2011/0266974 A1 | 11/2011 | Thornton et al. |
| 2014/0062332 A1* | 3/2014 | Kim .................. H05B 37/0272 315/228 |

FOREIGN PATENT DOCUMENTS

| | | |
|---|---|---|
| JP | 2012023010 A | 2/2012 |
| JP | 2014050313 A | 3/2014 |
| WO | 2010027401 A1 | 3/2010 |
| WO | 2011002783 A2 | 1/2011 |
| WO | 2014013381 A1 | 1/2014 |

\* cited by examiner

RADIO FREQUENCY (RF) CONTROLLED LAMP WITH DIMMER COMPATIBILITY

CROSS-REFERENCE TO PRIOR APPLICATIONS

This application is the U.S. National Phase application under 35 U.S.C. § 371 of International Application No. PCT/IB2015/051792, filed on Mar. 12, 2015, which claims the benefit of U.S. Patent Application No. 61/969,517, filed on Mar. 24, 2014. These applications are hereby incorporated by reference herein.

TECHNICAL FIELD

The present invention is directed generally to control of solid state lighting fixtures. More particularly, various inventive devices and methods disclosed herein relate to remotely controlling a lamp with dimmer compatibility.

BACKGROUND

Digital or solid state lighting technologies, i.e., illumination based on semiconductor light sources, such as light-emitting diodes (LEDs), offer a viable alternative to traditional fluorescent, high-intensity discharge (HID), and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

Some of the fixtures embodying these sources feature a lighting unit, including one or more LEDs capable of producing white light and/or different colors of light, e.g., red, green and blue, as well as a controller or processor for independently controlling the output of the LEDs in order to generate a variety of colors and color-changing lighting effects, for example, as discussed in detail in U.S. Pat. Nos. 6,016,038 and 6,211,626, incorporated herein by reference. LED technology includes line voltage powered white lighting fixtures, such as the EssentialWhite™, available from Philips Color Kinetics. EssentialWhite™ may be dimmable using trailing edge dimmer technology, such as electric low voltage (ELV) type dimmers for 220 VAC line voltages (or input mains voltages).

Many lighting applications make use of dimmers. Conventional dimmers work well with incandescent (bulb and halogen) lamps. However, problems occur with other types of electronic lamps, including compact fluorescent lamp (CFL), low voltage halogen lamps using electronic transformers and solid state lighting (SSL) lamps, such as LEDs and OLEDs. Low voltage halogen lamps using electronic transformers, in particular, may be dimmed using special dimmers, such as ELV type dimmers or resistive-capacitive (RC) dimmers, which work adequately with loads that have a power factor correction (PFC) circuit at the input.

Conventional dimmers typically chop a portion of each waveform of the input mains voltage signal and pass the remainder of the waveform to the lighting fixture. A leading edge or forward-phase dimmer chops the leading edge of the voltage signal waveform. A trailing edge or reverse-phase dimmer chops the trailing edges of the voltage signal waveforms. Electronic loads, such as LED drivers, typically operate better with trailing edge dimmers. Unlike incandescent and other resistive lighting devices which respond naturally without error to a chopped sine wave produced by a phase chopping dimmer, LEDs and other solid state lighting loads may incur a number of problems when placed on such phase chopping dimmers, such as low end drop out, triac misfiring, minimum load issues, high end flicker, and large steps in light output.

Radio or radio frequency (RF) controlled lighting units generally include onboard radio transceivers or modems, and are often referred to as "connected lamps," such as the Philips Hue. However connected lamps do not always work well in combination with wall dimmers or electronic switches. Such electronic switches are used, for example, in various sensors that enable automatic operation of the lighting units, including daylight sensors, presence/occupancy detectors, or remotely controlled switches, such as in the ClickOnClickOff (COCO) portfolio, for example. In the future, when multiple control systems need to work together (e.g., radio controlled lamps plus building management systems that switch groups of light sockets), electronic switches may become more common.

Most consumer lighting controllers are two-wire devices. A problem therefore arises when a dimmer or electronic switch interrupts just one of the two wires, as discussed below. In fact, most consumer lighting controllers are two-wire devices that only interrupt the live wire. In this configuration there is no neutral connection to the lighting controller that would enable the off-state current to run through the lighting unit(s). An off-state bleeder may be included to ensure that the lighting unit does not flicker or glow when the dimmer is switched off. In case, however, the RF radio (transceiver or modem) in a conventional radio control lighting device is no longer functional, as a practical matter, when the dimmer or switch is in off-state.

A lighting unit controlled by a two-wire device, for example, works well when the lamp appears as a low impedance load, as in the case of an incandescent lamp. The lamp must provide a current path to keep the dimmer or switch in operation. When the lamp comprises an LED lamp, though, the load may be so high-impedance that even with the very small remaining leakage current through the switch, the lamp can start to emit (some) light and boot software running on its internal microcontroller. This behavior leaks to visible glowing or flickering, and is undesired when the dimmer or electronic switch is set in an off-state.

To prevent this undesirable operation, a conventional LED lamp may include an "off-state bleeder," which is a small electronic circuit connected in parallel with the LED lamp. The off-state bleeder ensures that there is always enough current floating such that the dimmer or switch may continue to function, and that the LED lamp remains off when the dimmer or electronic switch is in the off-state. This configuration resolves the problem by provide flow of a small current when the electronic switch or lamp is in the off-state.

However, the connected lamp may draw too little power to let this current flow. If the dimmer or electronic switch no longer functions as a result, it may fail to switch on again. Also, the connected lamp sees some power on its mains power line connector, and may try to boot up. The connected lamp may flicker during this attempt, which may be annoying to the user.

Thus, there is a need in the art to detect improper operation of lighting system components, such as the dimmer and/or the solid state lighting load driver, and to identify and implement corrective action to correct the improper operation and/or remove power to the solid state lighting load, to eliminate undesirable effects, such as light flicker.

SUMMARY

The present disclosure is directed to inventive devices and methods for a radio in an RF controlled lighting unit that remains functional during very low dimming state of a dimmer (low phase cut angle of rectified input mains voltage) and/or an off-state of the dimmer or an electronic switch, via a modified bleeder circuit that extracts power from a bleeder circuit to continue to provide power to a transceiver and microprocessor of the radio. This also enables new features to make interaction more user friendly.

Generally, in one aspect, a radio frequency (RF) controlled lighting unit is provided, suitable for connection to at least one of a dimmer configured to adjust a phase cut angle of an input mains voltage from mains in accordance with an adjustable dimming level or an electronic switch configured to provide selection between an on-state and an off-state. The lighting unit includes a solid state light source; a radio circuit configured to receive a wireless control signal, enabling control of the lighting unit; a rectifier circuit configured to rectify the input mains voltage received from the dimmer or the electronic switch; a first power converter configured to drive the solid state light source in response to the rectified input mains voltage and to deliver power to the radio circuit; and a second power convertor configured to deliver power to the radio circuit when the rectified input mains voltage becomes inadequate for the first power converter due to the phase-cut angle of the rectified input mains voltage or the off-state of the electronic switch.

In another aspect, a method is provided for remotely controlling a lighting unit configured to adjust a phase cut angle of an input mains voltage from mains in accordance with at least one of an adjustable dimming level or an electronic switch configured to provide selection between an on-state and an off-state. The method includes connecting a resistive bleeder circuit in parallel with a light emitting diode (LED) light source of the lighting unit, the resistive bleeder circuit applying a resistive load to the dimmer when the input mains voltage becomes inadequate to drive the LED light source due to the phase-cut angle or the off-state of the input mains voltage; extracting power from the resistive bleeder circuit for powering a radio circuit when the resistive bleeder circuit is connected in parallel with the LED light source; and receiving a control signal wirelessly at the radio circuit when the radio circuit is powered by the power extracted from the resistive bleeder circuit, the control signal indicating a desired lighting level of the LED light source.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., LED white lighting fixture) may include a number of dies which respectively emit different spectra of electroluminescence that, in combination, mix to form essentially white light. In another implementation, an LED white lighting fixture may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white light LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens"

often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, microcontrollers, application specific integrated circuits (ASICs), and field-programmable gate arrays (FPGAs).

In various implementations, a processor and/or controller may be associated with one or more storage media (generically referred to herein as "memory," e.g., volatile and nonvolatile computer memory such as random-access memory (RAM), read-only memory (ROM), programmable read-only memory (PROM), electrically programmable read-only memory (EPROM), electrically erasable and programmable read only memory (EEPROM), universal serial bus (USB) drive, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same or similar parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Generally, it is desirable for a user or sensor to be able to switch on a radio controlled lighting unit when a dimmer and/or an electronic switch otherwise controlling the lighting unit is otherwise providing inadequate power, for example, when the dimmer is in a very low dimming state and/or when the dimmer or the electronic switch is in an off-state (or nearly off-state, as discussed below). Applicants have recognized and appreciated that it would be beneficial to provide a circuit that remains powered by a bleed current, so that it is capable of receiving and responding to commands when the dimmer or electronic switch is in the low dimming or off-state, such as switching on the lighting unit or notifying the user via a transmitted message that it is unable to switch on the lighting unit due to the dimmer or electronic switch being in the low dimming or off-state when the user or sensor attempts to switch on the lighting unit via a radio signal. Generally, according to various embodiments, an off-state resistive bleeder circuit is modified to provide a bias supply for the radio circuit to enable continued wireless communication with the user or sensor, while still providing steady light output from the lighting unit, e.g., without flicker or uncontrolled fluctuation in output light levels, regardless of dimmer settings.

In view of the foregoing, various embodiments and implementations of the present invention are directed to a radio frequency (RF) controlled lighting unit (or lamp), connectable to a dimmer configured to adjust a phase cut angle of an input mains voltage from mains in accordance with at least one of an adjustable dimming level and/or an electronic switch configured to provided selection between an on-state and an off-state, capable of operating when the phase cut angle is very low or the dimmer and/or the electronic switch is in the off-state.

Figure 1:
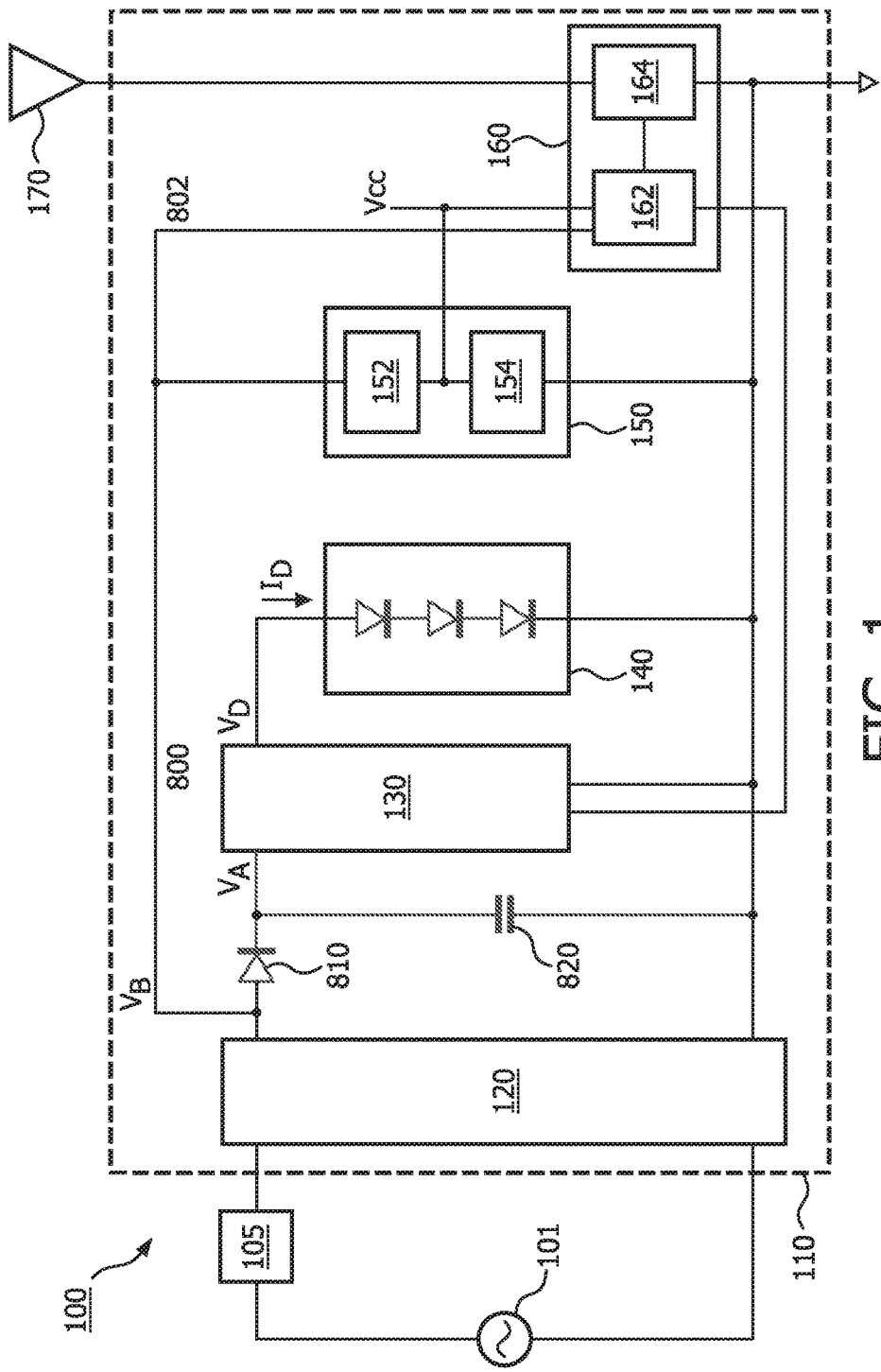
FIG. 1 is a block diagram showing a radio frequency (RF) controlled lighting system, according to a representative embodiment.

FIG. 1 is a block diagram showing a radio frequency (RF) controlled lighting system, according to a representative embodiment.

Referring to FIG. 1, RF controlled lighting system 100 includes dimmer 105 and RF controlled lighting unit 110 (lamp), where the dimmer 105 is configured to adjust a phase cut angle of an unrectified input mains voltage from voltage mains 101 in accordance with an adjustable dimming level. The voltage mains 101 may provide different unrectified input mains voltage values, such as 100 VAC, 120 VAC, 230 VAC and 277 VAC, according to various implementations. The dimmer 105 may be a phase chopping dimmer, for example, which provides dimming capability by chopping trailing edges (trailing edge dimmer) or leading edges (leading edge dimmer) of voltage signal waveforms from the voltage mains 101 in response to manual operation of a slider or knob, for example.

In various embodiments, the dimmer 105 may also be operated remotely, for example, in response to wireless dimming control signals received from a remote control device and/or a sensor (e.g., an occupancy sensor). In order to be operated remotely, the dimmer 105 would require a wireless receiver or transceiver configured to receive, demodulate and process the wireless dimming control signals and a controller configured to electronically control operation of the dimmer 105 in response to the processed control signals, as would be apparent to one of skill in the art. In an example, the remote control device may be a hand held RF transmitter, such as a smart phone, in which remote control functions are presented to the user in the form of an application ("app"). Alternatively, the remote control device may be a dedicated transmitting device, e.g., for line-of-sight communication, to operate the dimmer 105 specifically and/or the RF controlled lighting system 100 generally. Reception of the wireless control signal from the remote control device may occur via a bridge or a router (not shown) that relays the wireless control signal, and translates the wireless control signal from one standard to another. For example, the bridge or the router may translate the wireless control signal between various standards, such as translating between Wi-Fi (IEEE 802.11) with HyperText Markup Language (HTML) commands and ZigBee Light Link commands.

Figure 1A:
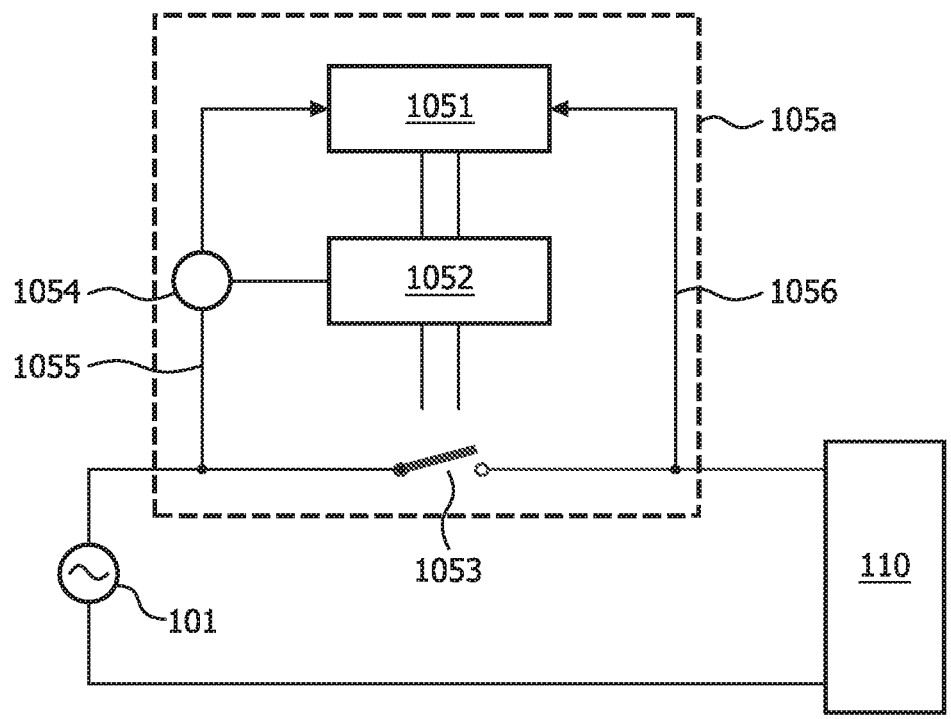
FIG. 1a is a block diagram showing an electronic switch of an RF controlled lighting system, according to a representative embodiment.

An electronic switch may be included in place of or in addition to the dimmer 105, where the electronic switch provides selection between an "on-state" and an "off-state." FIG. 1a is a block diagram showing an electronic switch of an RF controlled lighting system, according to a representative embodiment.

Referring to FIG. 1a, electronic switch 105a is characterized by a mechanical or solid state (e.g. triac) switch 1053 that is controlled electronically by a controller 1052. The controller 1056 needs a power supply 1051 that is fed via the wires 1055 and 1056. Here, off-state may refer to a state that allows a small amount of current leakage, typically via wires 1055 and 1056 and the power supply 1051, or as a leakage though the solid state switch 1053 (as opposed complete disconnection from the power source), which enables the electronic switch 105a, and in particular controller 1052, to continue functioning at a low level. For example, the current leakage feeds the power supply 1051, which enables the electronic switch 105a to react to an observation by sensor 1054, for example, by entering the on-state from the off-state.

In various configurations, the dimmer 105 in FIG. 1 may include a fully dimmed setting which corresponds to an off-state of an electronic switch, such as the electronic switch 105a. To a large extent, issues and solutions for the dimmer 105 and the electronic switch 105a are substantially the same. For example, off-state leakage currents (e.g.

through the power supply 1051, and the wires 1055 and 1056) may cause light emitting diodes (LEDs), such as LEDs 141 to 143 of solid state light source 140) to glow or flicker, which requires counter measures. On the other hand, such current may allow a radio circuit 160 in the RF controlled lighting unit 110 to receive enough power for some basic operations, as discussed below. The radio circuit 160 may be implemented, for example, as a simple radio consisting of at least antenna and radio frequency oscillator element and/or a radio integrated circuit (IC), or the like.

In various embodiments, the electronic switch 105a also may be operated remotely, for example, in response to wireless switch control signals received from a remote control device and/or a sensor (e.g., sensor 1055). As discussed above with regard to the dimmer 105, in order to be operated remotely, the electronic switch 105a would require a wireless receiver (or transceiver) configured to receive, demodulate and process the wireless switch control signals and a controller configured to control operation of the electronic switch 105a in response to the processed control signals, as would be apparent to one of skill in the art.

Referring again to FIG. 1, the RF controlled lighting unit 110 receives unrectified (AC) voltage from voltage mains 101, which may be dimmed or undimmed, e.g., depending on circuit configuration and/or the phase cut angle setting (i.e., dimmer setting) of the dimmer 105. The RF controlled lighting unit 110 includes rectification circuit 120, first power converter 130, solid state light source 140, second power converter 150 and the radio circuit 160. The rectifier 120 may contain a full-bridge rectifier (e.g., four diodes), but not a storage capacitor to smooth the DC voltage. This allows the phase cut information to be retrieved. In the depicted configuration, the solid state light source 140 includes multiple LEDs connected in series, indicated by representative LEDs 141 to 143.

The rectification circuit 120 provides (dimmed) rectified voltage from voltage mains 101. A storage capacitor 820 is used to smooth the DC voltage to a constant value. Generally, the magnitude of the smoothed and rectified voltage $V_R$ depends on the phase cut angle or dimmer setting of the dimmer 105, such that a low phase cut angle corresponding to a lower setting results in a lower rectified voltage and vice versa. In an alternative embodiment, the blocking diode 810 may be omitted and the degree to which the LEDs 141 to 143 are dimmed directly follows the dependency of the rectified voltage $V_R$ and averaged bleeder voltage $V_B$ on the phase cut angle. In effect, the least dimming occurs when the dimmer 105 is at a high setting (corresponding to a high phase cut angle), and the most dimming occurs when the dimmer 105 is at a low setting (corresponding to a low phase cut angle). Yet, this typically does not lead to a desirable dimming curve as dependency may be far from linear. In an embodiment, the first power converter 130 or the radio circuit 160 measures via (optional) line 800 or phase detection line 802, respectively, the phase cut angle and translates the measured phase cut angle in the appropriate LED current $I_D$. To allow proper phase cut angle measurements, the effect of the smoothing capacitor 820 is blocked by the blocking diode 810 from the angle detect point (e.g., option al line 800 or phase detection line 802). In such case, the bleeder voltage $V_B$ is a rectified but not averaged voltage that follows the phase cut waveform, while the rectified voltage $V_R$ is a better stabilized supply voltage for the first power converter 130 and the second power converter 150.

The first power converter 130 is configured to drive the solid state light source 140 with drive voltage in response to the rectified input mains voltage from the rectification circuit 120. Generally, the first power converter 130 translates the rectified input mains voltage into an appropriate DC drive voltage $V_D$ applied to the solid state light source 140 to provide a constant drive $I_D$ current through the LEDs 141 to 143. For example, the RF controlled lighting unit 110, the first power converter 130 or the radio circuit 160, may include a dimmer phase cut angle detection circuit (not shown), to determine or measure values of the phase cut angle of the dimmer 105 based on the rectified voltage, enabling the first power converter 130 to provide the appropriate DC drive voltage. For the purposes of measuring the phase cut angle, the first power convertor 130 may include a microcontroller or other controller (not shown). Alternatively this task is executed by the second power converter 150. That is, in various embodiments, first power converter 130 may receive a power control signal from the dimmer phase cut angle detection circuit, which may be a pulse width modulation (PWM) signal that alternates between high and low levels in accordance with a selected duty cycle. For example, the power control signal may have a high duty cycle (e.g., 100 percent) corresponding to a maximum on-time (high phase cut angle) of the dimmer 105, and a low duty cycle (e.g., 0 percent) corresponding to a minimum on-time (low phase cut angle) of the dimmer 105. When the dimmer 105 is set in between maximum and minimum phase cut angles, the duty cycle of the power control signal is set to specifically correspond to the detected phase cut angle. The first power converter 130 thus converts between the rectified voltage and the DC drive voltage based on at least the magnitude of the rectified voltage and the value of the power control signal received from the phase cut angle detection circuit. The first power converter 130 may also deliver power to the radio circuit 160, discussed below, when the dimmer 105 is at an operable dimmer setting (i.e., not at a very low dimmer setting or in the off-state) and/or the electronic is in the on-state (i.e., not in the off-state).

In various embodiments, the first power converter 130 operates in an open loop or feed-forward fashion, as described in U.S. Pat. No. 7,256,554 to Lys, for example, which is hereby incorporated by reference. However, other types of solid state light source 140 and/or other types of light loads may be included, without departing from the scope of the present teachings. Various techniques for providing the DC drive voltage and drive current to the solid state light source 140 may be implemented without departing from the state of the present teachings.

Both the first power convertor 130 and the second power converter 150 are fed by the rectifier 120. In fact, the first and second power converters 130 and 150 may be considered connected in parallel. The blocking diode 810 and capacitor 820 may be considered part of first power converter 130. The blocking diode 810 assures that the original waveform remains intact to enable precise measurement of the phase cut angle. Moreover, a resistive bleeder circuit 152 of the second power converter 150 may be most effective if connected to a rectified non-smoothed waveform, thus storage capacitor 820 is particularly effective for the first power supply 130, but not for bleeder voltage $V_B$ and the second power converter 150. The solid state light source 140 is fed by the first power converter 130.

The second power converter 150 includes the resistive bleeder circuit 152 and a power extractor 154. The resistive bleeder circuit 152 is configured to apply a resistive load to the input mains voltage from the voltage mains 101, such that a minimum current flows through the lighting unit 110 even when the solid state light source 140 does not extract sufficient power from the voltage mains 101. This ensures that the dimmer 105 and/or the electronic switch 105*a* continue to receive power. Thus, the resistive bleeder circuit 152 assures that the solid state light source 140 does not give off light when the dimmer 105 is at a very low dimmer setting or in the off-state (and/or the electronic switch 105*a* is in the off-state), e.g., by suppressing voltage swing across the solid state light source 140.

For example, the resistive bleeder circuit 152 may include a resistance that is switched into parallel configuration with the solid state lighting load 140 at low currents, to draw extra current along with the solid state lighting load 140, thus increasing the load to a sufficient minimum for operation of the dimmer 105. When the dimmer 105 is offering enough power for the solid state light source 140 to give a large amount of light, the radio circuit 160 may also receive power from the first power converter 130 (not shown in FIG. 1, but elaborated in FIG. 4, discussed below), since ample power is available, so that the radio circuit 160 is able to operate at full functionality. However, at low phase cut angles and/or in an off-state, the radio circuit 160 is effectively rationed limited power via the second power convertor 150. That is, the radio circuit 160 is generally configured to receive power from the first power convertor 130 when the phase cut angle or the off-state of the rectified input mains voltage are adequate for full functionality, and to alternatively receive power from the second power converter when the phase cut angle or the off-state of the rectified input mains voltage becomes inadequate.

For example, as discussed below with reference to FIG. 4, the combination from a power combiner (e.g., power combiner 495) of power from the second power converter 150 and/or the first power converter 130 may be implemented by two diodes, and a regulator (e.g., on-state control power supply 490) to lower the voltage coming out of the first power converter 130. Alternatively, lowering of the voltage may be achieved by tapping current from only the first LED 141 (or first and second LEDs 141 and 142) in the solid state light source 140 and a diode towards the supply voltage pin of the radio circuit 160.

Also, the radio circuit 160 may be further configured to transmit at least one message to a user when receiving power from the second power converter 150. The radio circuit 160 may also reduce energy consumption when only power from the second power convertor 150 is available. For instance, reducing energy consumption may include reducing transmit activity of the transceiver 564 by selectively reducing types of messages that are transmitted. For example, in order to reduce energy consumption, the only type of message that is transmitted may be warning messages, warning for example that the requested light level can not be achieved with the current phase-cut angle of the rectified input mains voltage (implemented by the dimmer 105) and/or state of the electronic switch 105*a*. Such a warning message may be generated or retrieved from memory by the microprocessor 162, and transmitted by the transceiver 164 to a remote control device or other wireless communication device, for example, where it may be displayed to a user and/or processed by a corresponding processing device to enable formulation of a response. Other types of messages may provide instruction on manually operating the dimmer 105 and/or the electronic switch 105*a* to attain the desired lighting level, for example.

The power extractor 154 is connected to the resistive bleeder circuit 152 and configured to provide power to the radio circuit 160 (or other control function) when the solid state light source 140 does not extract sufficient power from the voltage mains 101, for example, enabling the radio circuit 160 to receive wireless signals even when the dimmer 105 is at a very low dimmer setting or in the off-state (and/or the electronic switch 105*a* is in the off-state). In the depicted configuration, the power extractor 154 is connected in series with the resistive bleeder circuit 152 to extract power therefrom, and the radio circuit 160 is connected in parallel with the power extractor 154, although other configurations may be implemented without departing from the scope of the present teachings. Thus, the role of the power extractor 154 is generally to extract power for the radio circuit 160. The power extractor 154 may also regulate the voltage provided to the radio circuit 160 (if the radio circuit 160 is not doing this itself), as well as support current through the resistive bleeder circuit 152 to ensure that the dimmer 105 remains functioning.

The radio circuit 160 includes a transceiver 164 connected to antenna 170 for enabling wireless communications with various control sources, such as hand-held remote control devices and various sensors, to receive instructions and/or to provide information. That is, the transceiver 164 may be configured to receive wireless control signals from a remote control device and to send responsive messages. The transceiver 164 and antenna 170 may also enable wireless communications with the dimmer 105 and/or the electronic switch 105*a* to wirelessly receive status information (e.g., dimmer settings and on/off states) and output control signals to remotely operate the dimmer 105 and/or the electronic switch 105*a*. In various embodiments, the transceiver 164 may also receive and measure control signals from a power line (e.g., mains power line) or a sensor and/or communicate electronically with the dimmer 105 and/or the electronic switch 105*a* via the power line (or other physical channel). The sensor may be located anywhere, as long as it has a radio transmitter and is within radio range of its receiver. The radio circuit 160 also includes a microcontroller 162 for processing the received status information and for determining and generating appropriate control signals in response. The microcontroller 162 is thus configured to determine and implement responses to the wireless control signals and/or the measured control signals. For example, the response may include a light output setting (e.g., light level, color, etc.) and/or a message sent over a radio channel, such as a warning message that the light level can not be achieved with the current setting of the dimmer and/or state of the electronic switch, as discussed above.

That is, the microcontroller 162 may be configured to determine a desired lighting level of the solid state light source 140 in response to the wireless control signal, and send a feedback control signal to the dimmer 105 to cause the dimmer 105 to adjust the input mains voltage to correspond to the determined lighting level and/or to the electronic switch to switch to an on-state. The microcontroller 162 may send the feedback control signal to the dimmer 105 and/or the electronic switch 105*a* wirelessly over a radio channel or over the power line. For example, the transceiver 164 of the radio circuit 160 may include a first transceiver unit for transmitting and/or receiving radio signals to enable the microcontroller 162 to send the feedback signal wirelessly, and/or a second transceiver unit for transmitting and/or receive signals by wire to enable the microcontroller 162 to send the feedback control signal over the power line. In various embodiments, the microcontroller 162 may change the light level output by the solid state light source 140 without necessarily communicating with the dimmer 105. For example, if the dimmer setting of the dimmer 105 is high (i.e., little or no dimming), the microcontroller 162 may cause the first power converter 130 to simply reduce the light output by the solid state light source 140 without changing the rectified mains voltage. Alternatively, the microcontroller 162 may send a message to the remote control device via the transceiver providing instruction on manually operating the dimmer 105 and/or the electronic switch to attain the desired lighting level.

In various embodiments, the microcontroller 162 may set the output light of the solid state light source 140 to a last specified dimming level previously sent via the wireless control signal or the power line, e.g., whichever signal changed last. Similarly, the microcontroller 162 may set the solid state light source 140 to output light at a lowest specified dimming level previously sent via the power line or the wireless control signal, e.g., whichever signal demands the lowest setting. 25. Also, the microcontroller 162 may set the solid state light source to output light based on a look-up table (not shown), for example, received from the wireless remote control device. A measured phase cut angle may be input to the look-up table and a corresponding desired light setting may be output from the lookup table.

Figure 2:
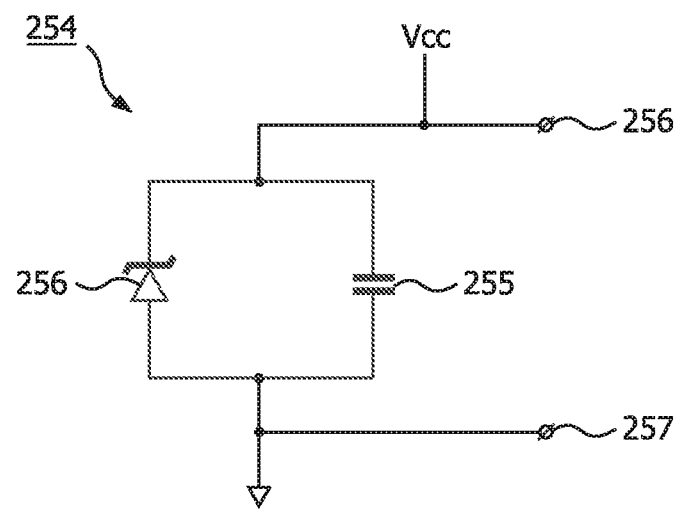
FIG. 2 is a block diagram showing a power extractor of the RF controlled lighting system of FIG. 1, according to a representative embodiment.

FIG. 2 is a block diagram showing a power extractor of the RF controlled lighting system of FIG. 1, according to a representative embodiment. In the depicted embodiment, the configuration of the power extractor is effectively independent of the resistive bleeder circuit, and therefore the power extractor operates as described regardless of the type of resistive bleeder circuit may be in place (examples of which are discussed below with reference to FIGS. 3A to 3D.

Referring to FIG. 2, power extractor 154 includes a capacitor 255 connected between voltage Vcc and a ground voltage, and a Zener diode 256 connected in parallel with the capacitor 255. A cathode of the Zener diode 256 is connected to the voltage Vcc and an anode of the Zener diode is connected to the ground voltage. The Zener diode 256 ensures that bleeder leakage current can still flow when the capacitor 255 is fully charged. This improves the operation of the dimmer 105 and/or the electronic switch when the radio circuit 160 extracts only a small amount of power or a low current. The capacitor 255 needs to be large enough to allow being charged only during small fractions of the 50 Hz/60 Hz cycle of the mains 101 when the dimmer 105 allows current to flow. Also the radio circuit 160 may draw large peak currents during a few milliseconds of transmission, which should not discharge the capacitor 255 too much. The voltage Vcc connection provides a power supply for the radio circuit 160, which is connected in parallel with the power extractor 154 via terminals 257 (Vcc connection) and 258 (ground connection). In an embodiment, the power extractor 154 may further include a voltage regulator (not shown) configured to stabilize the voltage Vcc provided to the radio circuit 160 from the power extractor 154. The voltage regulator is discussed further below with reference to FIG. 5.

FIGS. 3A to 3E are block diagrams showing second power convertors of the RF controlled lighting system of FIG. 1, including different resistive bleeder circuits used in conjunction with the power extractor, according to representative embodiments.

Figure 3A:
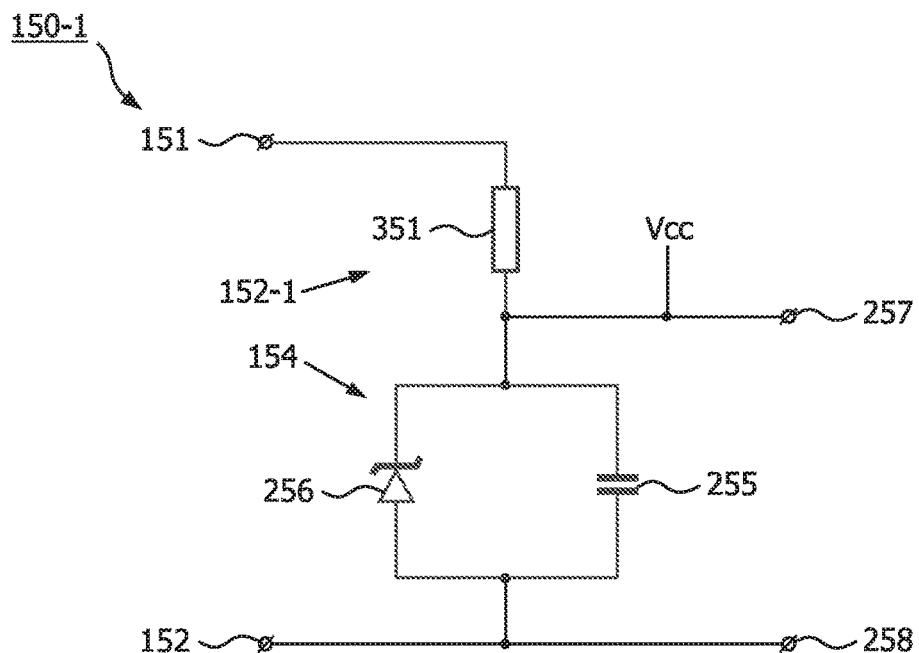
FIGS. 3A to 3E are block diagrams showing second power convertors of the RF controlled lighting system of FIG. 1, including different resistive bleeder circuits used in conjunction with the power extractor, according to representative embodiments.

Referring to FIG. 3A, second power converter 150-1 includes resistive bleeder circuit 152-1 and the power extractor 154. The resistive bleeder circuit 152-1 simply includes a bleeder resistor 351. The power extractor 154 is configured as described above with reference to FIG. 2, and therefore the description will not be repeated. Terminals 151 and 152 arranged to the left of the second power converter 150-1 to connect the second power converter 150-1 (that is, the series combination of the resistive bleeder circuit 152-1 and the power extractor 154) in parallel with each of the first power converter 130 and the solid state light source 140. Of course, in alternative configurations, the solid state light source 140 may be connected on the right side of the second power converter 150-1, as long as the solid state light source 140 and the second power converter 150-1 are arranged in parallel with one another. The terminals 257 and 258 arranged to the right of the second power converter 150-1 to connect the power extractor in parallel with the radio circuit 160, enabling the radio circuit 160 to receive voltage Vcc, as discussed above.

Figure 3B:
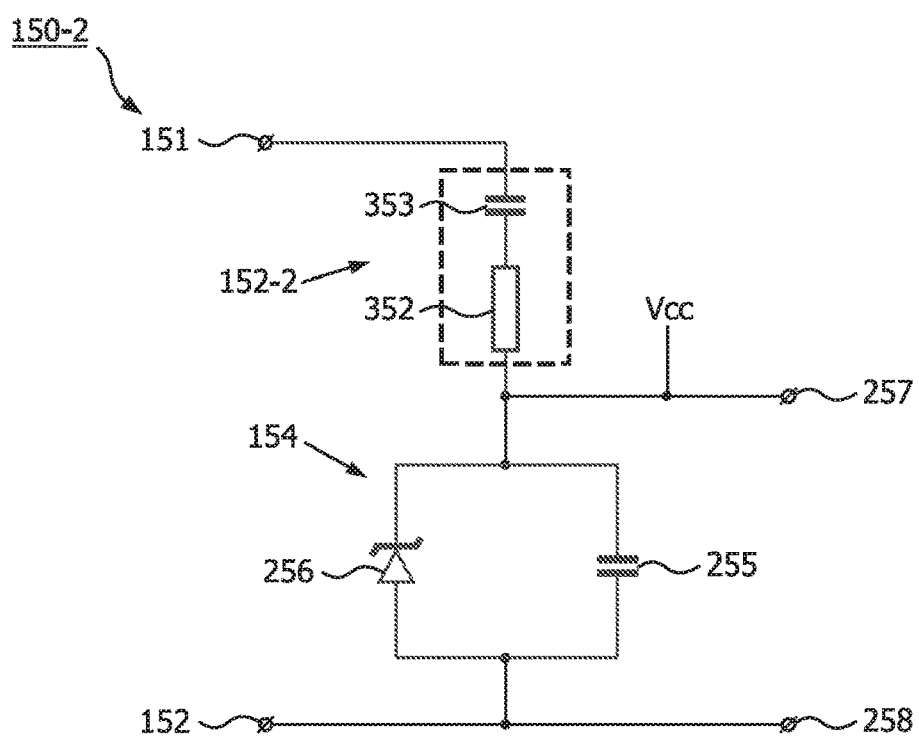

Referring to FIG. 3B, second power converter 150-2 includes resistive bleeder circuit 152-2 and the power extractor 154. The resistive bleeder circuit 152-2 includes a bleeder resistor 352 and a bleeder capacitor 353 connected in series. Terminals 151 and 152 connect the second power converter 150-1 in parallel with each of the first power converter 130 and the solid state light source 140, and the terminals 257 and 258 connect the power extractor 154 in parallel with the radio circuit 160, as discussed above.

Figure 3C:
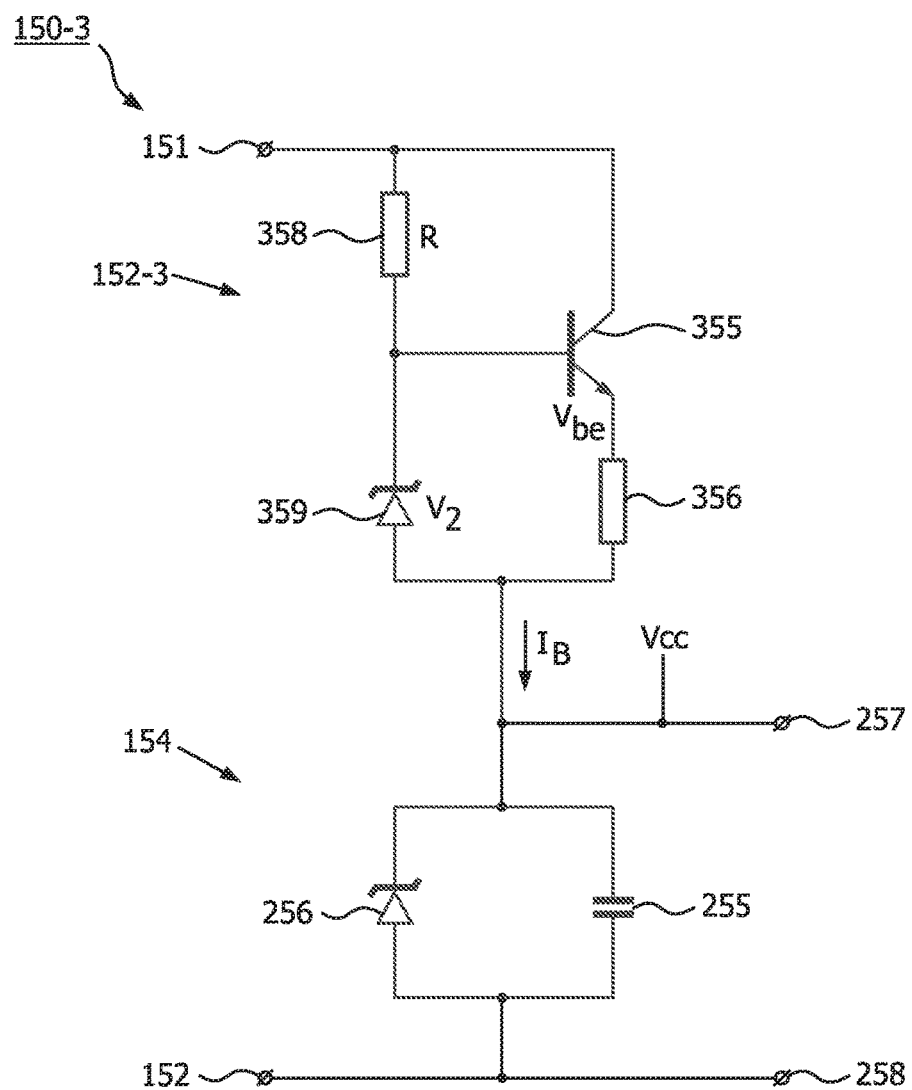

Referring to FIG. 3C, second power converter 150-3 includes resistive bleeder circuit 152-3 and the power extractor 154. The resistive bleeder circuit 152-3 includes a current source configured to provide a substantially constant bleeder current $I_B$. In the depicted example, the current source is implemented by bi-polar junction transistor (BJT) 355. The BJT 355 includes a collector connected to terminal 151, an emitter connected to terminal 257 (at the power extractor 154) via emitter resistor 356, and a base connected to the terminal 151 via a base resistor 358 and connected to the terminal 257 via a Zener diode 359. The substantially constant current $I_B$ is approximately equal to the difference between a voltage $V_z$ across the bleeder Zener diode 359 and a base-emitter voltage Vbe of the BJT 355, divided by a resistance value R of the emitter resistor 356 (that is, $I_B=(V_Z-Vbe)/R$). Terminals 151 and 152 connect the second power converter 150-1 in parallel with each of the first power converter 130 and the solid state light source 140, and the terminals 257 and 258 connect the power extractor 154 in parallel with the radio circuit 160, as discussed above.

Figure 3D:
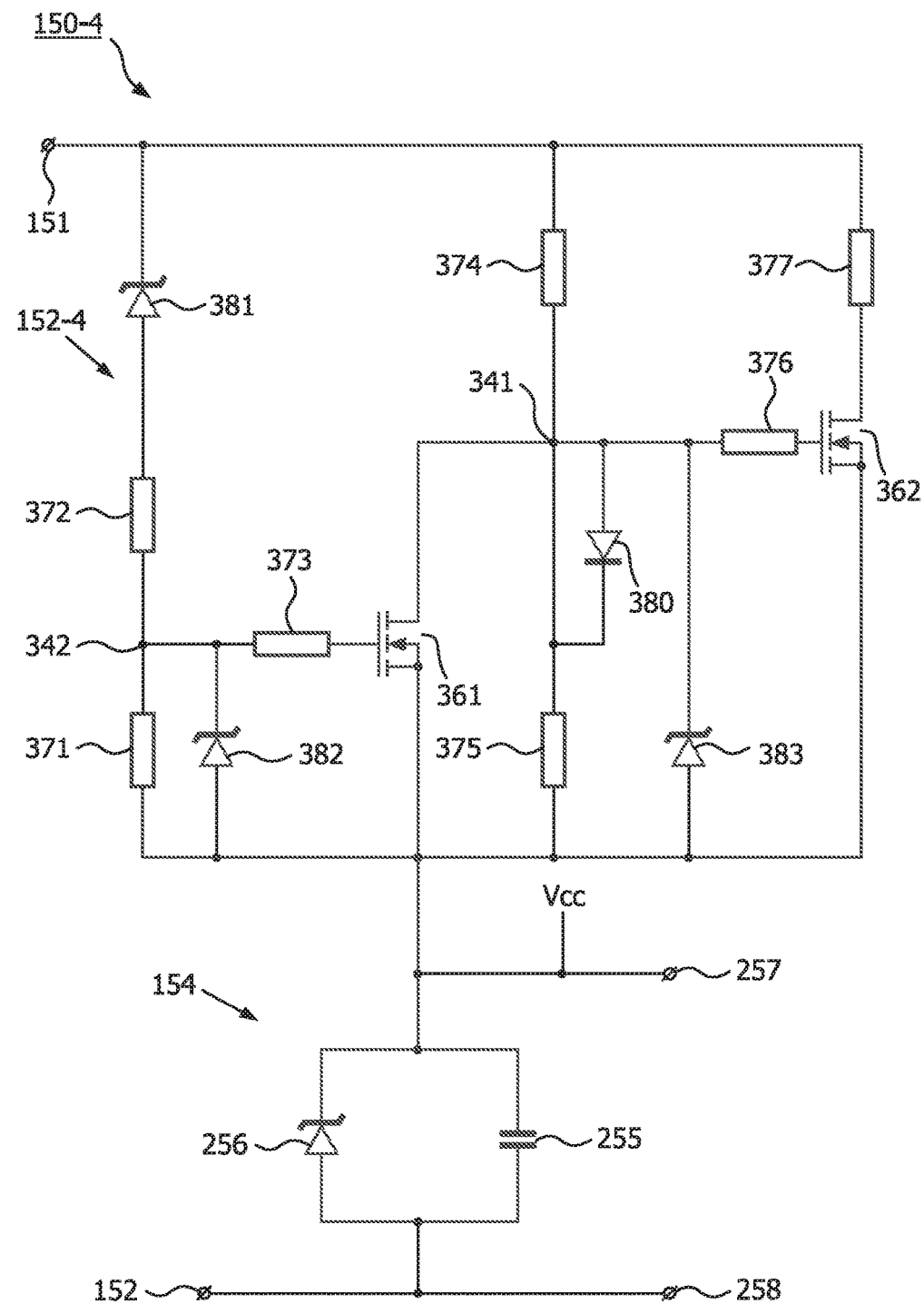

Referring to FIG. 3D, second power converter 150-4 includes resistive bleeder circuit 152-4 and the power extractor 154. The resistive bleeder circuit 152-4 is an example of a more complex resistive bleeder circuit, as described for example in U.S. Patent App. Pub. No. 2006/0192502 to Brown et al. (published Aug. 31, 2006), which is hereby incorporated by reference. In particular, similar to FIG. 2 of Brown et al., the resistive bleeder circuit 152-4 includes a first metal-oxide-semiconductor field-effect transistor (MOSFET) 361 having a first gate, a first drain and a first source, and a second MOSFET 362 having a second gate, a second drain and a second source. The second drain of the second MOSFET 362 is connected to terminal 151 via resistor 377. The second source of the second MOSFET 362 is connected to terminal 257 (and thus the power extractor 154). The second base is connected to the first drain of the first MOSFET 361 at node 341 via resistor 376. In addition, resistor 374 is connected between node 341 and terminal 151; resistor 375 is connected between node 341 and terminal 257; diode 380 is connected between node 341 and resistor 375; and Zener diode 383 is connected between node 341 and terminal 257.

The first source of the first MOSFET 361 is connected to terminal 257, and the first gate of the first MOSFET 361 is connected to node 342 via resistor 373. In addition, resistor 372 and Zener diode 381 are connected between node 342 and terminal 151; resistor 371 is connected between node 341 and terminal 257; and Zener diode 382 is connected between node 342 and terminal 257.

The resistor/Zener diode circuit comprising resistors 371, 372 and the Zener diode 381 is configured to determine a magnitude of the rectified input mains voltage to be applied to the first gate of the first MOSFET 371. The second MOSFET 372 is configured to receive at the second gate an inverted output from the first drain of the first MOSFET 371, where the second MOSFET 372 is ON even when the adjusted input mains voltage passes through zero. The resistor 377 connected to the second drain of the second MOSFET 372 is configured to determine the magnitude of the resistive load applied to the dimmer 105. In this configuration, the resistive bleeder circuit 152-4 may be activated, for example, during a time period when power applied to the resistive bleeder circuit 152-4 by the voltage mains 101 is substantially between +10 volts and zero volts and between −10 volts and zero volts. Terminals 151 and 152 connect the second power converter 150-4 in parallel with each of the first power converter 130 and the solid state light source 140, and the terminals 257 and 258 connect the power extractor 154 in parallel with the radio circuit 160, as discussed above.

Figure 3E:
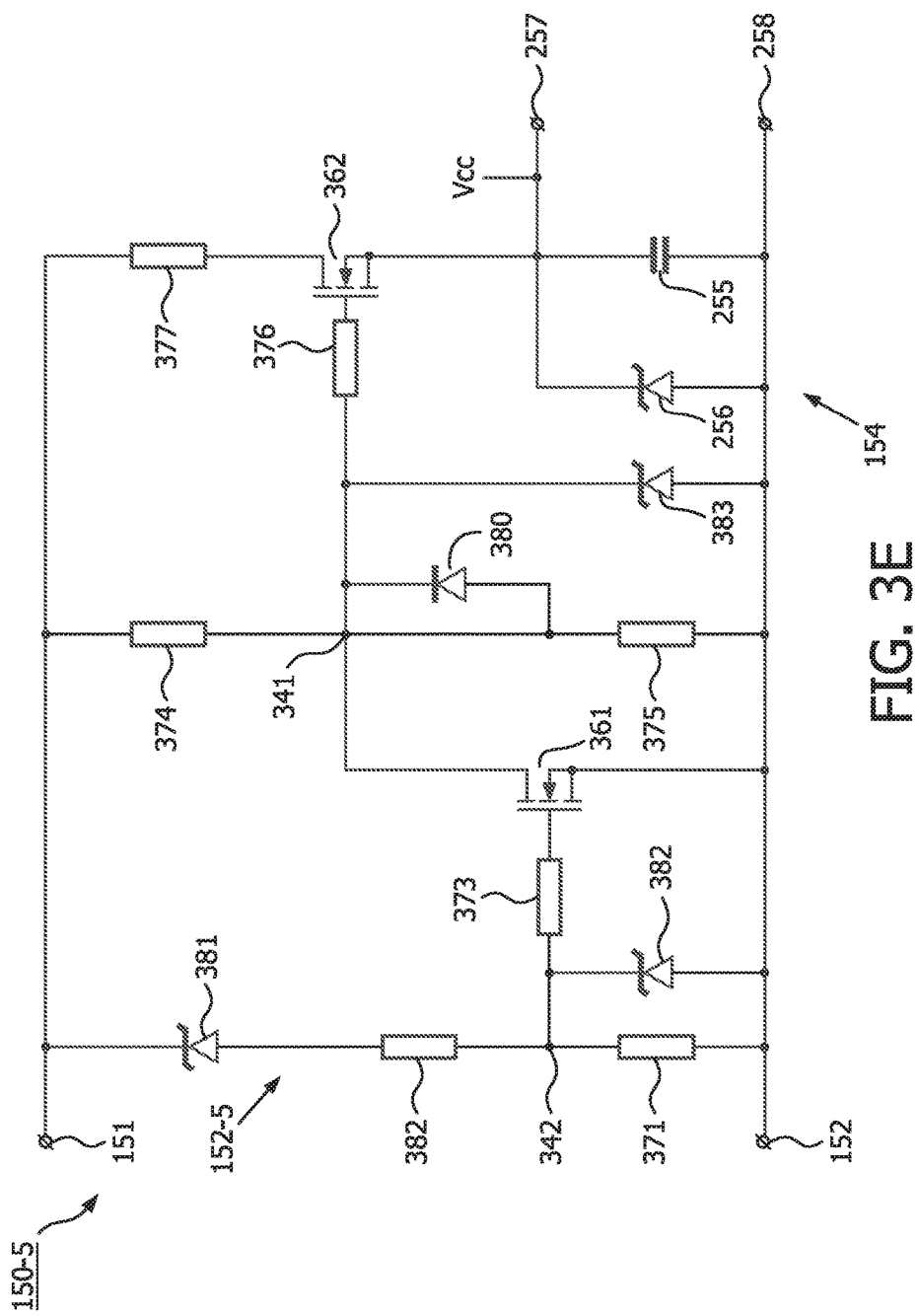

Referring to FIG. 3E, second power converter 150-5 includes resistive bleeder circuit 152-5 and the power extractor 154 integrated with the resistive bleeder circuit 152-5. In particular, the resistive bleeder circuit 152-5 is similar to the resistive bleeder circuit 152-4, discussed above, except that the circuitry of the power extractor 154 is incorporated within the circuitry of resistive bleeder circuit 152-5, which is otherwise substantially the same as the resistive bleeder circuit 152-4 (e.g., corresponding to FIG. 2 in U.S. Patent App. Pub. No. 2006/0192502).

The configuration differs from the previously discussed second power converters 150-1 to 150-4, in which the resistive bleeder circuit and the power extractor are essentially independent from one another and can be arranged in various combinations, in that power in the second power converter 150-5 is extracted in current from of the second emitter of the second MOSFET 372 (i.e., the main power transistor). The resistive bleeder circuit 152-5 has an extra output (terminals 257 and 258) that feeds power into the radio circuit 160. In the depicted configuration, the wire carrying the bleeder main current from the second source of the second MOSFET 372 is interrupted for insertion of the power extractor 154 (the Zener diode 256 in parallel with the capacitor 255).

In an illustrative embodiment, the capacitor 255 may have a value of about 47 microfarads (µf) and the Zener diode 256 may have a Zener voltage value of about 3.3 volts or 5 volts, for example. As mentioned above, the Zener diode 256 is connected across Vcc (terminal 257) and ground (terminal 258) to ensure that the bleeder leakage current can still flow when the capacitor 255 is fully charged. A useful extension is to choose the Zener voltage value slightly higher, e.g., about 9 volts to about 12 volts, and to add a voltage regulator, such as a known linear regulator IC, such as Voltage Regulator IC 7805 available from Fairchild Semiconductor®, to stabilize the voltage Vcc offered to the radio circuit 160.

The current in the second MOSFET 372 has only one "ear" (i.e., a brief period of large current) on the right side of (i.e., immediately following) the mains zero crossing when the dimmer 105 is on. The second MOSFET 372 is fully turned on when the mains voltage rises above 30V, for example, while the first MOSFET 371 is not yet active. The second MOSFET 372 is turned off at about 70V. The second gate of the second MOSFET 372 is essentially floating at mains zero crossings due to parasitic capacitances of the first and second MOSFETs 371 and 372 and diode blocking reverse current. Therefore, the current in the second MOSFET 372 already starts to flow when the mains voltage is above a few volts (e.g., more than about 10 volts). Of course, in various alternative configurations, the sources and drains of the MOSFET transistors may be switched, or other types of transistors, including BJTs and other types of FETs, may be incorporated without departing from the scope of the present teachings. Also, component values may be incorporated without departing from the scope of the present teachings.

Under some circumstances, power extracted from a resistive bleeder circuit may not be enough to supply the radio circuit (e.g., the radio IC) and other functions when the lighting unit is on. FIG. 4 is a block diagram showing an RF controlled lighting system, in which power supplied from a resistive bleeder circuit is combined with power from another power supply, according to a representative embodiment.

Figure 4:
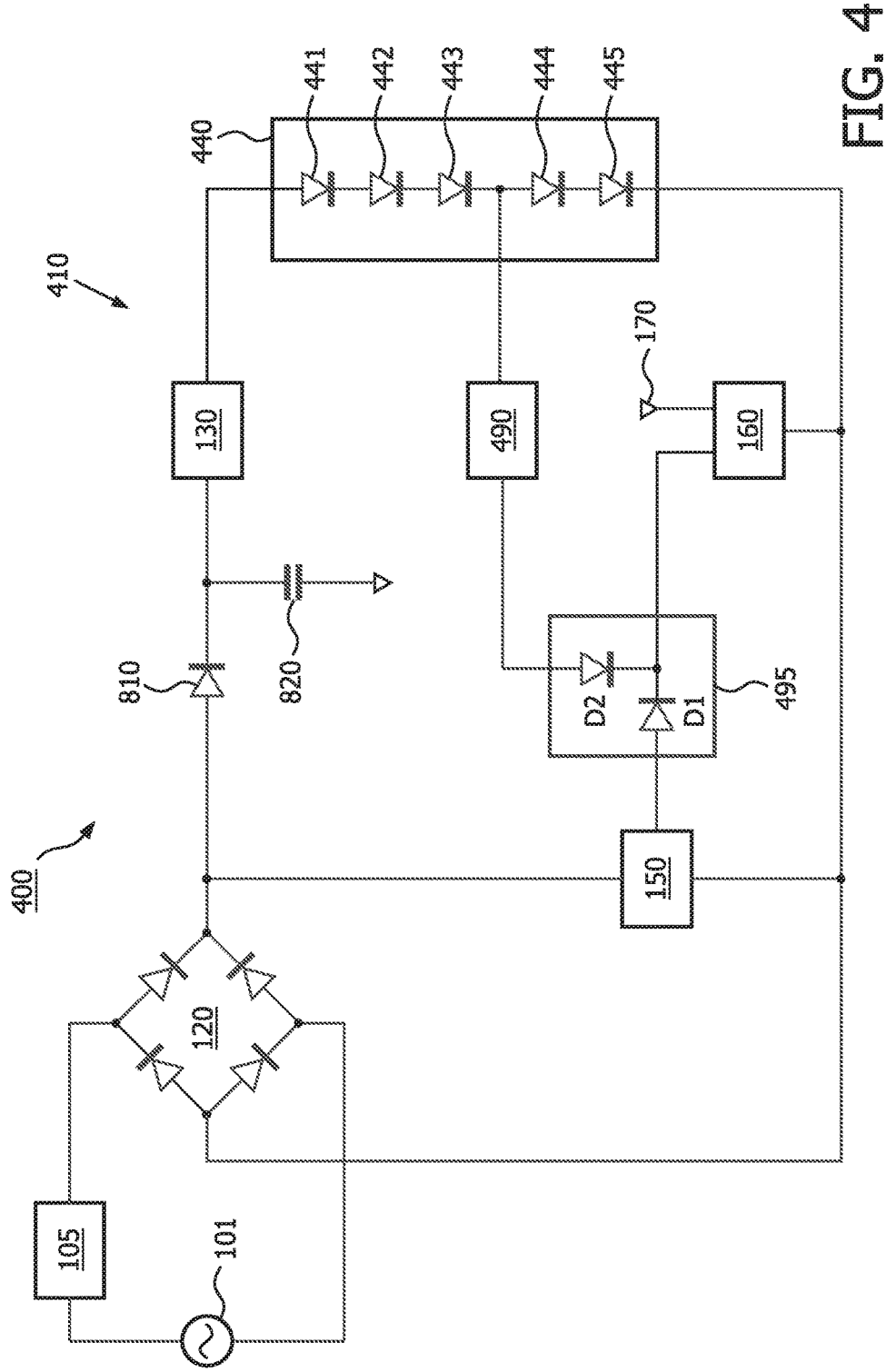
FIG. 4 is a block diagram showing an RF controlled lighting system, in which power supplied from a resistive bleeder circuit is combined with power from another power supply, according to a representative embodiment.

Referring to FIG. 4, RF controlled lighting system 400 includes dimmer 105 and RF controlled lighting unit 410 (lamp), where the dimmer 105 is configured to adjust a phase cut angle of an unrectified input mains voltage from voltage mains 101 in accordance with an adjustable dimming level. The RF controlled light unit 410 includes rectification circuit 120, first power converter 130, second power converter 150, and radio circuit 160, which are substantially the same as discussed above with reference to FIGS. 1 to 3D, and therefore the corresponding descriptions will not be repeated. For example, the second power converter 150 (resistive bleeder circuit with power extractor) may be implemented as any one of the above embodiments, second power converter 150-1 to 150-5. The RF controlled light unit 410 also includes on-state control power supply 490, power combiner 495, and a solid state light source 440, which includes representative LEDS 441 to 445. The power to the LEDS 441 to 445 go through blocking diode 810 followed by storage capacitor 820, and the further driver electronics of the first power convertor 130. In the depicted embodiment, the input to the on-state control power supply 490 is over some of the lower LEDs (e.g., LEDs 444 and 445) in the LED string of the solid state light source 440. Alternatively, the input to the on-state control power supply 490 may be before the blocking diode 810, behind the blocking diode 810, or behind the first power convertor 130, without departing from the spirit of the present teachings. The on-state control power supply 490 is optimized for operation during normal on-state or during a modest degree of phase cut dimming by the dimmer.

As shown in FIG. 4, the power combiner 495 includes first and second diodes D1 and D2 configured to take the power from a first supply (e.g., second power converter 150) or second supply (e.g., first power converter 130 and/or solid state light source 440), whichever delivers the highest voltage. As shown, the first diode D1 is arranged to conduct in a direction from the second power converter 150 towards the radio circuit 160, and the second diode D2 is arranged to conduct in a direction from the on-state control power supply 490 towards the radio circuit 160. Alternatively, the functionality of the first and second diodes D1 and D2 may be implemented by one or more transistors that are actively switched. The on-state power supply 490 reduces to "stealing" some current from the solid state light source 440.

The regulation of the supply voltage occurs implicitly because the voltage across the LEDs 441 to 445 is approximately 3 Volts regardless of the current through the LEDs 441 to 445. The power combiner 495 is configured to combine power extracted from the resistive bleeder circuit 152 by the power extractor 154 in the second power converter 150 and power provided by the on-state control power supply 490. In an embodiment, the ratio of the combination varies depending on the power demand. For example, in an embodiment, the power output by the power combiner 495 may be taken entirely from the second power converter 150 when sufficient, while the power from the on-state control power supply 490 may be incrementally added as demand requires. Essentially, the first and second diodes D1 and D2 in the power combiner 495 ensure that the radio circuit 160 is powered from the relatively high-power first power converter 130, and only extracts a small amount of power from the second power converter 150 when the solid state light source 440 is (almost) fully off. This allows the radio circuit 160 to operate during on-states and off-states. In an embodiment, the power combiner 495 may be integrated into the radio circuit 160.

Figure 5:
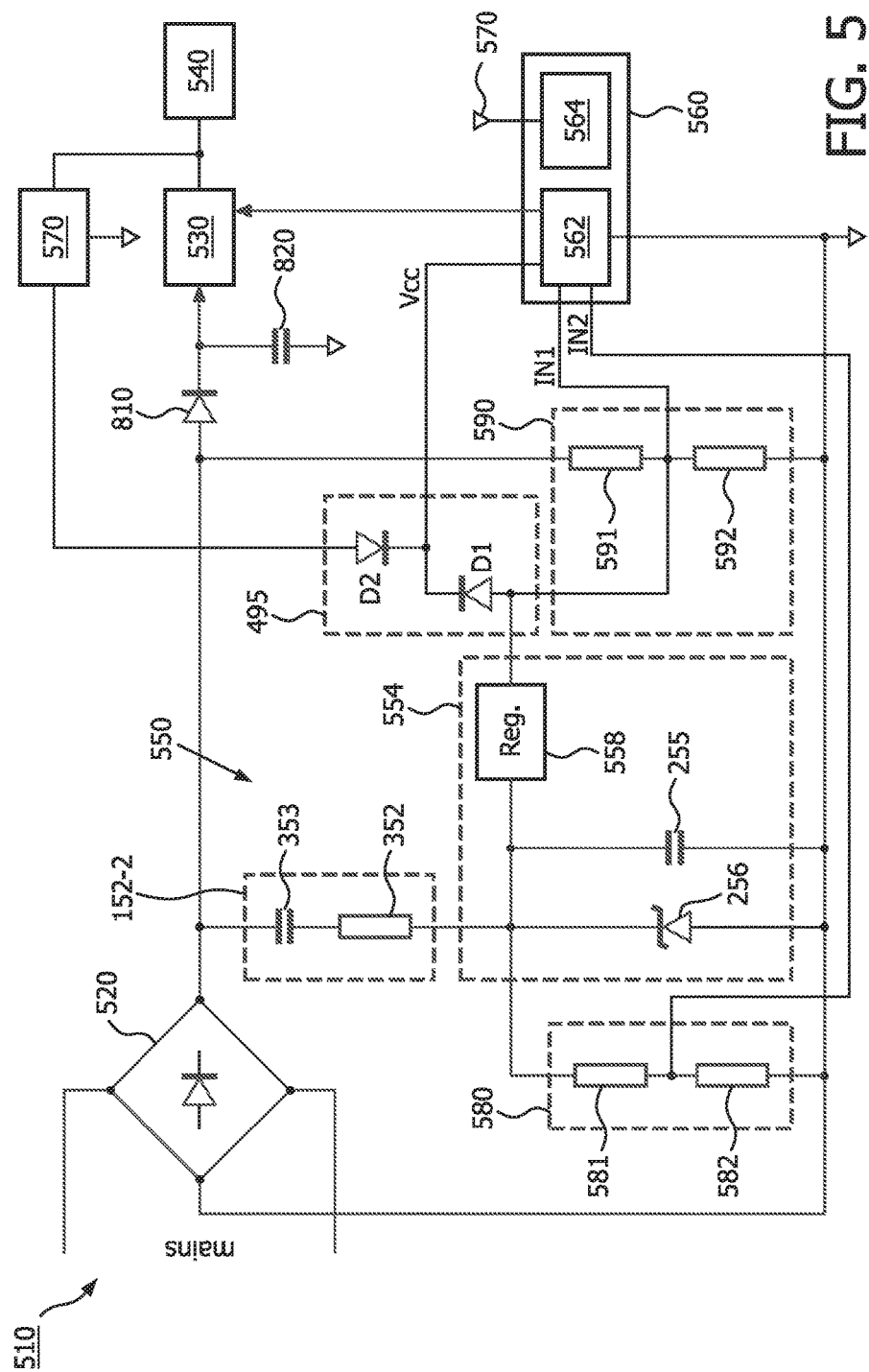
FIG. 5 is a block diagram showing an RF controlled lighting system, according to another representative embodiment.

FIG. 5 is a block diagram showing an RF controlled lighting system, according to another representative embodiment.

Referring to FIG. 5, RF controlled light unit 510 receives unrectified voltage from the voltage mains 101 (not shown in FIG. 5), which may be dimmed or undimmed. The RF controlled light unit 510 includes rectification circuit 520, first power converter (LED driver) 530, solid state light source 540, second power converter 550, power monitor 580, phase cut angle detector 590, and radio circuit 560. The radio circuit 560 may be a radio IC, for example, and includes microcontroller 562 and transceiver 564, connected to antenna 570. The rectification circuit 520, the first power converter 530, the solid state light source 540, the second power converter 550, the radio circuit 560 and the antenna 570 may be substantially the same as the rectification circuit 120, the first power converter 130, the solid state light source 140, the second power converter 150, the radio circuit 160, and the antenna 170, respectively, discussed above with reference to FIGS. 1 to 3E, and the following description will be directed to differences between these elements. For example, the resistive bleeder circuit of the second power converter 550 may be implemented substantially the same as any of the resistive bleeder circuits 152-1 to 152-5, although for purposes of illustration, resistive bleeder circuit 152-2 is depicted.

Likewise, the power extractor 554 may be substantially the same as the power extractor 154 discussed above with reference to FIG. 2, except that it may include optional voltage regulator 558. The voltage regulator 558 stabilizes the voltage Vcc provided to the radio circuit 560. The voltage regulator 558 may be used when fluctuations across the capacitor 255 are too large, e.g., if the microcontroller 562 drains the capacitor 255 when transmitting. The output of the voltage regulator 558 is merged with power from a second supply by means of first and second diodes D1 and D2, which in essence perform the function of power combiner 495. However, in alternative configurations, the power extractor 554 may be replaced by a diode or a wire connection (input=output), such that the regulators (if present) and the diodes jointly form the power combiner 495. A practical embodiment of a regulator circuit usually already performs the function of a diode, such that if a regulator is present, the corresponding diode may be omitted. The power extractor 554 is configured to deliver power to the radio circuit 560, including the microcontroller 562, via Vcc and ground (respectively corresponding to terminals 257 and 258 in FIG. 2). A second voltage regulator 570 may be included to ensure that the voltage extracted from first power converter 530 is suitable for the microcontroller 562. Here, ground is a local reference ground in the RF controlled lighting unit 510 (and thus not galvanically the same as a neutral wire coming from the voltage mains 101).

The microcontroller 562 in the radio circuit 560 is configured to detect the phase cut angle of the dimmer 105 (not shown). To this end, the microcontroller 562 includes means for sampling the mains voltage. For example, the microcontroller 562 may observe voltage after the rectifier 520. To allow proper measurements, the rectified mains voltage is not smoothed by a capacitor. However, when the first power converter 530 prefers some particular capacitance, a diode (not shown) may be placed between the rectifier 520 and the first power converter 530, and a capacitor (not shown) may be placed behind this diode.

As shown in the embodiment of FIG. 5, the phase cut angle detector 590 includes a voltage divider, indicated by resistors 591 and 592. The phase cut angle detector 590 reduces the voltage level of the rectified mains voltage to a voltage level that can be handled by input IN1 for the microcontroller 562 for phase cut angle detection. In an embodiment, the phase angle detector 590 and/or the microcontroller 562 may be configured to detect the phase cut angle by sampling digital pulses corresponding to waveforms of the rectified input mains voltage and measuring consecutive half cycles based on lengths of the sampled digital pulses.

The input IN1 may be a digital input, in which case the microcontroller 562 calculates a fraction of time that the mains voltage is non-zero (e.g., above a predetermined threshold). This corresponds to the fraction of time that the mains cycle is non-interrupted, which can be translated to a phase cut angle of the mains voltage (by operation of the dimmer 105). Also, when the input IN1 is operated as a digital input, the resistor 591 may be about 1 Mohm between the rectified mains voltage and the input IN1, and the resistor 592 may be about 100 Kohm between the input IN1 and ground, for example. Alternatively, the input IN1 may be an analog input, in which case the microcontroller 562 is able to monitor the sinusoidal shape of the rectified mains voltage during the conducting time of the dimmer 105.

The power monitor 580 likewise includes a voltage divider, indicated by resistors 581 and 582, that reduces a voltage level of voltage output by the resistive bleeder circuit 552 that can be handled by input IN2 of the microcontroller 562. The voltage divider is needed since voltage at the capacitor 555 of the power extractor 554 is higher than the regulated voltage Vcc. Based on the output of the power monitor 580, the microcontroller 562 is able to monitor whether the power extractor 554 is able to deliver enough power to supply the radio circuit 560. When the voltage level at the input IN2 is too low, the radio circuit 560 may decide not to transmit, to delay a transmission until more power has been aggregated, or put the transceiver (or the receiver) in sleep mode. These actions prevent voltage Vcc from dropping too low, which would necessitate a time-out and rebooting of the radio circuit 560 once sufficient power is restored.

Alternatively, the input IN2 may be an analog input, in which case the radio circuit 560 must include an analog-to-digital converter (ADC). Also, alternatively, the voltage level at the input IN2 may be compared to a threshold voltage (e.g., internally in the radio circuit 560). When the voltage level at the input IN2 is below the threshold voltage, the radio circuit 560 takes actions to reduce power consumption, such as duty cycling the receiver, refraining from or delay transmission, etc. This may be done under control of the microprocessor 562.

In various embodiments, the microprocessor 162, 562 may be implemented using one or more processing devices, such as a computer, a processor, a microprocessor, a digital signal processor (DSP), one or more application specific integrated circuits (ASICs), one or more FPGAs, or combinations thereof, using software, firmware, hard-wired logic circuits, or combinations thereof. The microprocessor may have access to memory (not shown), comprising a non-transitory computer readable medium for storing operating software, modules, data and algorithms for executing the various embodiments described herein, including spectral determination and/or analysis of the analyte(s) of interest. Examples of a computer readable medium include various types of nonvolatile read only memory (ROM) and volatile random access memory (RANI), such as erasable programmable ROM (EPROM), electrically erasable programmable ROM (EEPROM), static RAM (SRAM), dynamic RAM (DRAM), a DVD, a universal serial bus (USB) drive, and the like, although implementations of the microprocessor and/or the computer readable media may vary without departing from the scope of the present teachings.

Referring again to FIG. 1, for purposes of illustration, the radio circuit 160 may be configured to implement various features in response to control signals and/or other input provided for example by remote control devices and/or sensors. For example, if a user attempts to switch on the RF controlled lighting unit 110 via a radio signal, while the dimmer 105 is in a fully dimmed or off-state (or while the electronic switch is in an off-state), the RF controlled lighting unit 110 responds with a message, generated or retrieved from memory by the microprocessor 162 and transmitted by the transceiver 164, to the effect that it is behind a dimmer and/or an electronic switch and cannot get enough power to perform the command provided by the radio signal. As another example, if the user attempts to switch on the RF controlled lighting unit 110 via a radio signal, while the dimmer 105 is in a fully dimmed or off-state (or while the electronic switch is in an off-state), the RF controlled lighting unit 110 sends a control signal to the dimmer and/or the electronic switch dimmer to transition out of the off-state (into the on-state). This control signal may be sent over a radio channel between the RF controlled lighting unit 110 and the dimmer 105 and/or the electronic switch, or this control signal may be sent over the power line from the RF controlled lighting unit 110 to the dimmer 105 and/or the electronic switch.

When the remote control device is using an application ("app"), there may be a fall back to app overrule, for example. That is, if a user wants to use an app to overrule the light setting provide by the dimmer 105, the user can do so. However, when dimmer phase cut angle is at a very low value (too low to give the RF controlled lighting unit 110 enough power) or in an off-state, the RF controlled lighting unit 110 sends a warning to the app. The app shows this on the screen "Dear home user, the setting that you like to control via this app can not be realized with the current dimmer setting. Please put the dimmer in full position." In other words, a message may be provided to the remote control device via from the microprocessor 162 via the transceiver 164 providing instruction on manually operating the dimmer 105 to attain the desired lighting.

Although much of the above description is generally directed to use of a legacy phase dimmer with manual control, it applies equally to dimmers that are equipped with a radio receiver. In this case, additional features may be implemented. For example, if the RF controlled lighting unit 110 receives a control command via its radio interface (e.g., radio circuit 160), but cannot execute this command because the dimmer 105 and/or electronic switch delivers too little power, then the RF controlled lighting unit 110 may send a control signal to the dimmer 105 and/or the electronic switch requiring it to change the phase cut angle or to transition from the off-state to the on-state.

A presence detector in the RF controlled lighting unit 110 that is able to detect presence during periods that the dimmer 105 and/or the electronic switch is in off-state. When a motion/new presence is detected by the presence detector, the radio circuit 160 will send a command message to the (wall) dimmer 105 and/or the (wall) electronic switch to the on-state.

Figure 6:
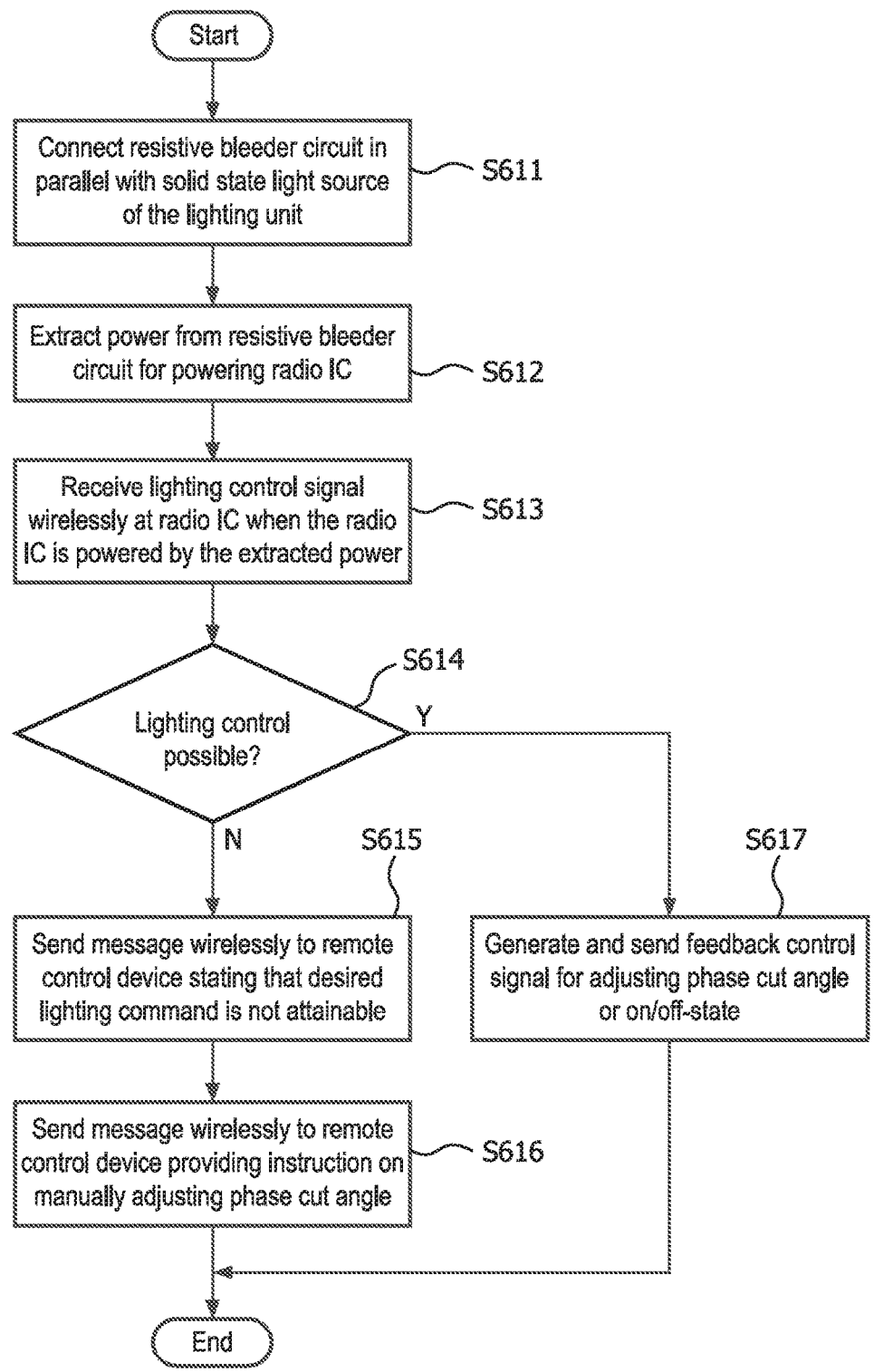
FIG. 6 is a flow diagram showing a process of operating an RF controlled lighting system, according to a representative embodiment.

FIG. 6 is a flow diagram showing a process of operating an RF controlled lighting system, according to a representative embodiment. The process may be implemented, for example, by firmware and/or software executed by the radio circuit 160, 560 shown in FIGS. 1 and 5.

Referring to FIG. 6, a method is provided for remotely controlling a lighting unit (e.g., RF controlled lighting unit 110) configured for connection to a dimmer configured to adjust a phase cut angle of an input mains voltage. Of course, substantially the same method may be applied to controlling an electronic switch (or a dimmer) with respect to switching between an on-state and an off-state, but not necessarily adjusting dimming levels. In block S611, a resistive bleeder circuit is connected in parallel with a solid state light source of the lighting unit, such as a light emitting diode (LED) light source. The resistive bleeder circuit applies resistive load to the dimmer when the input mains voltage becomes inadequate to drive the LED light source due to the phase-cut angle or the off-state of the input mains voltage. Power is extracted from the resistive bleeder circuit in block S612 for powering to a radio circuit (e.g., radio IC) when the resistive bleeder circuit is connected in parallel with the LED light source.

In block S613, a lighting control signal is received wirelessly, e.g., from a remote control device (or other controlling device), as discussed above, by the radio circuit when the radio circuit is powered by the power extracted from the resistive bleeder circuit. The lighting control signal may indicate a desired lighting level of the LED light source, or may indicate a desire to turn the LED light source from an off-state to an on-state. In response, it is determined in block S614 whether the lighting command indicated by the lighting control signal is possible to be performed given the present state of the RF controlled lighting unit. For example, it is determined whether the RF controlled lighting unit is in a highly dimmed or off-state, thus preventing execution of the lighting control signal.

When the lighting command cannot be performed (block S614: No), a message may be sent wirelessly in block S615 to the remote control device stating that the desired lighting level is not attainable because the LED light source is not receiving sufficient power, e.g., at a current phase cut angle of the input mains voltage or is in the off-state. In block S616, another message may be sent wirelessly to the remote control device providing instruction on manually adjusting the phase cut angle of the input mains voltage (or on switching to the on-state) to attain the desired lighting level.

When the lighting command can be performed (block S614: Yes), a feedback control signal is generated and sent from the radio circuit to the dimmer (or to the electronic switch) in block S617 for adjusting the phase cut angle of the input mains voltage (or for turning on the electronic switch) to achieve the desired lighting level, as indicated by the feedback signal. The feedback control signal may be sent wirelessly to the dimmer over a radio channel, or it may be sent over a wired power line. The LED light source may be adjusted to emit the desired lighting level indicated by the feedback control signal. Alternatively, the LED light source may be adjusted to emit the lesser of the desired lighting level indicated by the feedback control signal or a current phase cut angle of the input mains voltage, or the LED light source may be adjusted to emit the more recent of the desired lighting level indicated by the feedback control signal or an adjustment of the current phase cut angle of the input mains voltage.

The feedback control signal may include a dedicated command indicating whether the LED light source should be adjusted following a dimmer setting of the dimmer or not following the dimmer setting of the dimmer. The dedicated command indicates that the LED light source should be adjusted following the dimmer setting of the dimmer when the phase cut angle does not allow LED light source to emit the desired lighting level indicated by the feedback control signal.

While multiple embodiments have been described and illustrated herein, those skilled in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used.

Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, it may be understood that communications via radio as described above may also occur via various alternative means, such as infrared, visual light communication, ultrasound communication or via power line communication. When power line communication is used in combination with phase cut dimming or electronic switching, for example, it may be the case that high-frequency power line signals are not interrupted by the phase cut dimmer. One main difference between alternative communication means and radio communication, as in the embodiments discussed above, is that the communication interface (e.g., transceiver 164) is not connected to an antenna 170, but is connected to an ultrasound communication or an infrared IR photo diode, for example, or is connected to probe the mains for power line communication signals.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A radio frequency (RF) controlled lighting unit suitable for connection to at least one of a dimmer configured to adjust a phase cut angle of an input mains voltage from mains in accordance with an adjustable dimming level or an electronic switch configured to provide selection between an on-state and an off-state, the RF lighting unit comprising:
   a solid state light source;
   a radio circuit configured to receive a wireless control signal, enabling control of the RF lighting unit;
   a rectifier circuit configured to rectify the input mains voltage received from the dimmer or the electronic switch;
   a first power converter configured to drive the solid state light source in response to the rectified input mains voltage and to deliver power to the radio circuit; and
   a second power converter configured to deliver power to the radio circuit when the rectified input mains voltage becomes inadequate for the first power converter due to the phase-cut angle of the rectified input mains voltage or the off-state of the electronic switch.

2. The lighting unit of claim 1, wherein the radio circuit is further configured to receive power from the first power convertor when the phase cut angle or the off-state of the rectified input mains voltage are adequate for full functionality, and to alternatively receive power from the second power converter when the phase cut angle or the off-state of the rectified input mains voltage becomes inadequate for full functionality.

3. The lighting unit of claim 2, wherein the radio circuit is further configured to transmit at least one message to a user when receiving power from the second power converter.

4. The lighting unit of claim 3, wherein the radio circuit is further configured to reduce energy consumption when only power from the second power converter is available, and wherein reducing energy consumption comprises reducing transmit activity by selectively reducing types of messages that are transmitted to the user.

5. The lighting unit of claim 4, wherein the only type of message that is transmitted is a warning message warning that a requested lighting level can not be achieved with a current phase-cut angle of the rectified input mains voltage or a state of the electronic switch.

6. The lighting unit of claim 1, wherein the radio circuit comprises:
   a transceiver configured to receive the wireless control signal from a remote control device and to measure a control signal from a power line or a sensor; and
   a microcontroller configured to determine and implement a response to the wireless control signal and the measured control signal.

7. The lighting unit of claim 6, wherein the remote control device comprises a hand held RF transmitter, or a smart phone configured to present remote control functions to a user as an application.

8. The lighting unit of claim 7, wherein the wireless control signal is received from the remote control unit is via a bridge or a router that relays the wireless control signal, and translates the wireless control signal from one standard to another.

9. The lighting unit of claim 6, wherein the response comprises at least one of a light output setting and a message sent over a radio channel warning that the lighting level can not be achieved with the current setting of the dimmer or state of the electronic switch.

10. The lighting unit of claim 6, wherein the microcontroller determines a desired lighting level of the solid state light source in response to the wireless control signal, and sends a feedback control signal to the dimmer or the electronic switch to demand a higher delivered power level.

11. The lighting unit of claim 6, wherein the microcontroller sends a message to the remote control device via the transceiver further providing instruction on manually operating the dimmer to attain the desired lighting level.

12. The lighting unit of claim 6, wherein the sensor comprises a presence detector or a daylight sensor.

13. The lighting unit of claim 6, wherein the microcontroller sets the solid state light source to output light at a last or lowest specified dimming level previously sent via the power line or the wireless control signal.

* * * * *